US011361118B2

(12) United States Patent
Marill

(10) Patent No.: US 11,361,118 B2
(45) Date of Patent: Jun. 14, 2022

(54) SYMBIOTIC MODELING SYSTEM AND METHOD

(71) Applicant: Pascale Marill, Los Angeles, CA (US)

(72) Inventor: Pascale Marill, Los Angeles, CA (US)

( * ) Notice: Subject to any disclaimer, the term of this patent is extended or adjusted under 35 U.S.C. 154(b) by 283 days.

(21) Appl. No.: 15/916,346

(22) Filed: Mar. 9, 2018

(65) Prior Publication Data

US 2019/0278876 A1     Sep. 12, 2019

(51) Int. Cl.
*G06F 30/13* (2020.01)
*G06F 111/04* (2020.01)

(52) U.S. Cl.
CPC .......... *G06F 30/13* (2020.01); *G06F 2111/04* (2020.01)

(58) Field of Classification Search
CPC .................................... G06F 2111/04
USPC ............................................... 703/1
See application file for complete search history.

(56) References Cited

U.S. PATENT DOCUMENTS

| | | | |
|---|---|---|---|
| 528,116 A | 10/1894 | Brookmire et al. | |
| 5,701,400 A | 12/1997 | Amado | |
| 10,817,745 B2* | 10/2020 | Harrison | G06N 5/047 |
| 10,997,553 B2* | 5/2021 | McLinden | G06T 17/05 |
| 11,232,321 B2* | 1/2022 | Harrison | H05B 45/20 |
| 2005/0096950 A1* | 5/2005 | Caplan | G06Q 10/06395 |
| | | | 705/7.41 |
| 2006/0143220 A1* | 6/2006 | Spencer, Jr. | G06F 8/20 |
| | | | 707/999.102 |
| 2007/0050234 A1* | 3/2007 | Corlett | G06Q 10/00 |
| | | | 705/7.29 |
| 2009/0019022 A1 | 1/2009 | Schallert et al. | |
| 2014/0002489 A1 | 1/2014 | Sauder et al. | |
| 2014/0035752 A1 | 2/2014 | Johnson | |
| 2014/0075342 A1 | 3/2014 | Corlett | |
| 2018/0027725 A1* | 2/2018 | Koutsorodi | A01C 21/005 |

(Continued)

FOREIGN PATENT DOCUMENTS

WO        2002054272        7/2002

OTHER PUBLICATIONS

Anami_2008 (A text based approach to content based information retrieval for Indian medicinal plants, International Journal of Physical Sciences—Dec. 2008). (Year: 2008).*

(Continued)

*Primary Examiner* — Brian S Cook
(74) *Attorney, Agent, or Firm* — Gearhart Law LLC; David Postolski, Esq.

(57) ABSTRACT

A modeling server is in communication with multiple databases and/or knowledge systems. The modeling server may utilize predetermined rules for suggesting design elements such as plants, lighting, fencing, irrigation, and more. The modeling server may acquire legal information pertaining to the project, based on jurisdictions that contain the location of the project. The modeling server may further generate one or more teams to implement the project, including, but not limited to, design teams, construction teams, and/or management teams. The modeling server may further produce a rendering and/or simulation of a landscaping or landscape architecture project to facilitate improved customer engagement, which may result in increased customer satisfaction as well as improved project performance in terms of scheduling, budget, and longevity of the project.

17 Claims, 6 Drawing Sheets

(56) References Cited

U.S. PATENT DOCUMENTS

2019/0057338 A1* 2/2019 Botea ............ G06Q 10/063112

OTHER PUBLICATIONS

Advanced_Search_USDA_PLANTS_2017 (archived from wayback machine archive dated Jun. 8, 2017 downloaded from https://web.archive.org/web/20170608061118/https://plants.usda.gov/adv_search.html (Year: 2017).*

Herzfelder_2003 (More Than Just a Yard, Ecological Landscaping Tools for Massachusetts Homeowners, Executive Office of Environmental Affairs, 2003) (Year: 2003).*

Pietsch_2012 (Matthias Pietsch (2012). GIS in Landscape Planning, Landscape Planning, Dr. Murat Ozyavuz (Ed.), ISBN: 978-953-51-0654-8, InTech, Available from: http://www.intechopen.com/books/landscape-planning/gis-inlandscape-planning) (Year: 2012).*

Laws & Regulations_US EPA (web.archive.org/web/20170801022401/https://www.epa.gov/laws-regulations Aug. 1, 2017) (Year: 2017).*

\* cited by examiner

SYMBIOTIC MODELING SYSTEM AND METHOD

FIELD OF THE EMBODIMENTS

Embodiments of the invention relate generally to computer modeling, and more particularly, to a modeling system and method.

BACKGROUND

Organic (living) and inorganic (non-living) objects (not limited to structures and landscapes) are parts of the environment that are interconnected by a variety of systems. In the world of design, we may refer to inorganic or organic objects as structures (not limited to structure of a building but rather any form). These include desired purposes of the organic (living) and inorganic (non-living) objects, as well as topology, computer code(s), climate, and legal and budgetary constraints, to name a few. Every aspect of an organic (living) and inorganic (non-living) object(s) can affect other areas. For example, in building a landscape, if plant species are selected and placed according to a theme in a created setting, without regard to how that species may be predisposed to behave in the setting, it may not achieve the desired effect, or even worse, can have an adverse environmental impact. Impacts on other species of plants, local animals, sunlight, groundwater, and other environmental factors should be considered to ensure a satisfactory design. For example, creating designs for landscapes that consider a large number of such factors can be a highly complex process. Therefore, it is desired to have systems and methods that can take into account the pertinent principles to guide the design, construction, and/or daily maintenance of these organic (living) and/or inorganic (non-living) objects, and generate organic (living) and/or inorganic (non-living) objects that will require less energy and resources to maintain while providing improved environmental benefits.

SUMMARY OF THE EMBODIMENTS

In one embodiment, there is provided a computer-implemented method for design, comprising: obtaining a landscaping mode; obtaining an agricultural mode; obtaining an architecture mode; obtaining a budget range; deriving one or more project requirements from the obtained landscaping mode, agricultural mode, and architecture mode; and generating a proposed design team based on the project requirements and obtained budget range.

Another embodiment further comprises generating a proposed construction team.

Another embodiment further comprises generating a proposed management team.

Another embodiment further comprises generating a proposed computer engineering team for a project (i.e. for designing a smart oven that works within a large smart house—creating automation).

Another embodiment further comprises generating a proposed medical team for a project (i.e. designing "creating" a prescription medication).

Another embodiment further comprises generating a proposed analytical team to determine what is necessary for a project. (i.e. generate a team for understanding specifics about project or broader analytics within a specific subject).

Another embodiment further comprises generating an agricultural recommendation.

Another embodiment further comprises generating a code recommendation.

Another embodiment further comprises generating a social recommendation (i.e. how to increase connectivity within human interactions within a city plan or provide input on when to share information for marketing purposes).

In yet another embodiment, generating an agricultural recommendation is based on a privacy requirement.

In yet another embodiment, generating a product recommendation is based on a jurisdiction.

In yet another embodiment, generating an agricultural recommendation is based on an animal attraction requirement.

In yet another embodiment, generating an agricultural recommendation is based on a maintenance requirement.

In yet another embodiment, generating an agricultural recommendation is based on a climate.

In yet another embodiment, generating an agricultural recommendation is based on a geographical region.

In yet another embodiment, generating an agricultural recommendation is based on a jurisdiction.

Another embodiment further comprises generating a rendering of the agricultural recommendation.

Another embodiment further comprises an electronic computing device comprising: a processor; a memory coupled to the processor, the memory containing instructions, that when executed by the processor, perform the steps of: obtaining a landscaping mode; obtaining an agricultural mode; obtaining an architecture mode; obtaining a budget range; deriving one or more project requirements from the obtained landscaping mode, agricultural mode, and architecture mode; and generating a proposed design team based on the project requirements and obtained budget range.

In yet another embodiment, the memory further comprises instructions, that when executed by the processor, perform the step of generating a proposed construction team.

In yet another embodiment, the memory further comprises instructions, that when executed by the processor, perform the step of generating a proposed management team.

In yet another embodiment, the memory further comprises instructions, that when executed by the processor, perform the step of generating an agricultural recommendation.

In yet another embodiment, the memory further comprises instructions, that when executed by the processor, perform the step of generating a rendering of the agricultural recommendation.

Another embodiment comprises a computer program product for design, for an electronic computing device comprising a computer readable storage medium having program instructions embodied therewith, the program instructions executable by a processor to cause the electronic computing device to: obtain a landscaping mode; obtain an agricultural mode; obtain an architecture mode; obtain a budget range; derive one or more project requirements from the obtained landscaping mode, agricultural mode, and architecture mode; and generate a proposed design team based on the project requirements and obtained budget range.

Another embodiment further comprises program instructions executable by a processor to cause the electronic computing device to generate a proposed construction team.

Another embodiment further comprises program instructions executable by a processor to cause the electronic computing device to generate an agricultural recommendation.

Another embodiment further comprises program instructions executable by a processor to cause the electronic computing device to generate a rendering of the agricultural recommendation.

BRIEF DESCRIPTION OF THE DRAWINGS

The structure, operation, and advantages of disclosed embodiments will become further apparent upon consideration of the following description taken in conjunction with the accompanying figures (FIGs.). The figures are intended to be illustrative, not limiting. Certain elements in some of the figures may be omitted, or illustrated not-to-scale, for illustrative clarity.

DETAILED DESCRIPTION

Figure 1:
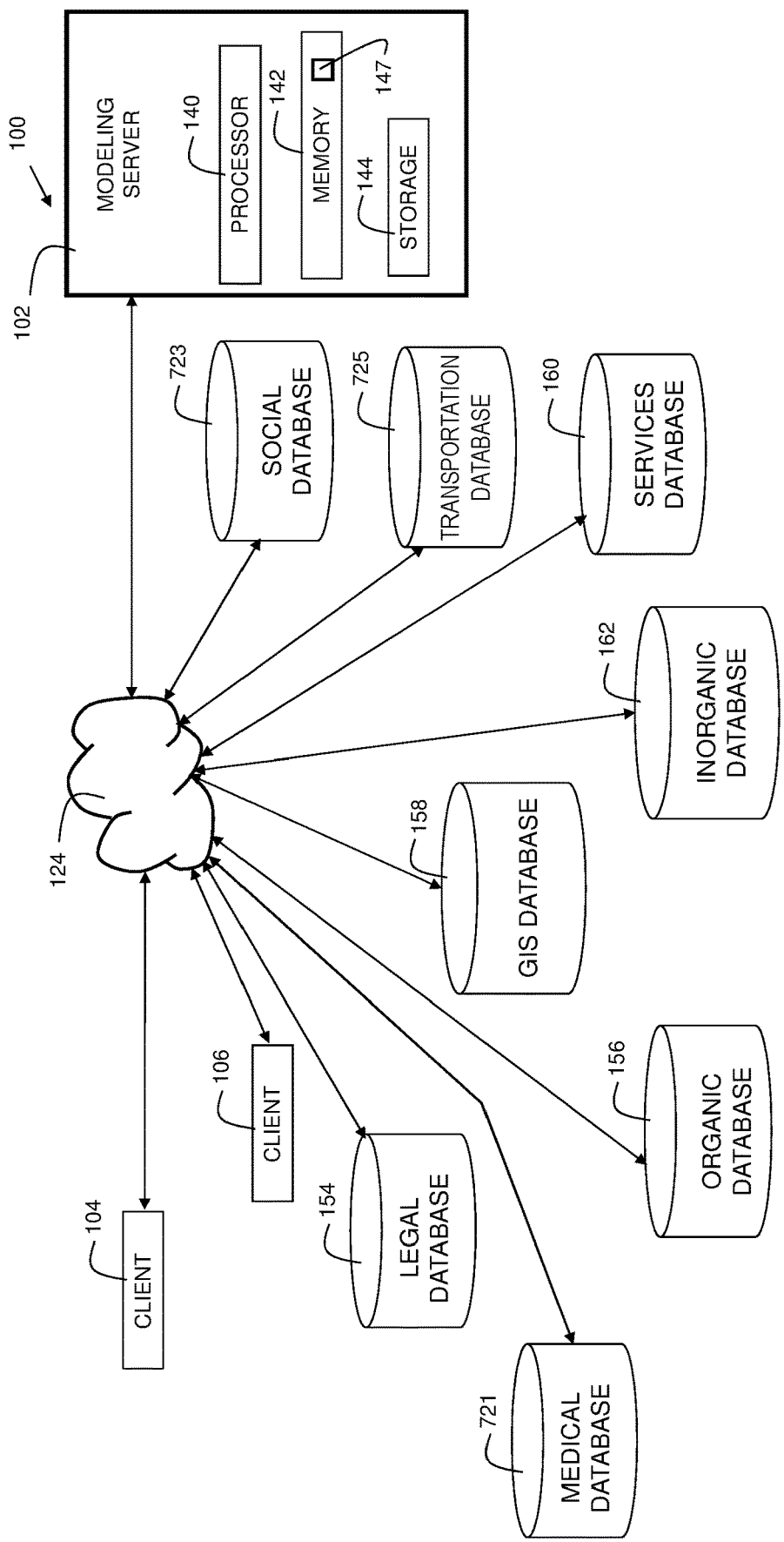
FIG. 1 is a block diagram of a system in accordance with embodiments of the present invention.

FIG. 1 depicts a system 100 in accordance with embodiments of the present invention. Some embodiments may provide a holistic approach to design. Some embodiments may include environmental and/or landscape design modeling. An environmental modeling server 102 can be implemented in an electronic computing device that includes a processor 140, a memory 142 coupled to the processor, and storage 144, also coupled to the processor 140. Memory 142 contains program instructions 147, that when executed by the processor 140, cause the environmental modeling server 102 to perform steps in accordance with embodiments of the present invention. Memory 142 may be a non-transitory computer readable medium. Memory 142 may include, but is not limited to, flash, read-only memory (ROM), static random-access memory (SRAM), magnetic storage, optical storage, or other suitable storage mechanism. Storage 144 may include, but is not limited to, one or more magnetic hard disk drives (HDD), solid state disk drives (SSD), optical storage devices, tape drives, and/or other suitable storage devices. In some embodiments, cloud storage may also be utilized.

The processor 140 may include multiple cores. In embodiments, the environmental modeling server 102 may include multiple processors, where each processor includes multiple cores. Embodiments may schedule tasks and threads over multiple processors and/or cores to achieve a level of parallelism in execution of various tasks, including, but not limited to, computations, searching, and/or rendering.

The term "Internet" as used herein refers to a network of networks which uses certain protocols, such as the TCP/IP protocol, and possibly other protocols, including, but not limited to, the hypertext transfer protocol (HTTP) for hypertext markup language (HTML) documents that make up the World Wide Web (web). Access to the Internet can be provided by Internet service providers (ISP) or future internet tools. Users on client systems, such as clients 104 and 106 obtain access to the Internet through the Internet service providers. Access to the Internet allows users of the client computer systems to exchange information, receive and send e-mails, and view documents, such as documents which have been prepared in the HTML format. These documents are often provided by web servers which are considered to be "on" the Internet. Often these web servers are provided by the ISPs, although a computer system can be set up and connected to the Internet without that system being also an ISP as is well known in the art.

One or more client devices, indicated as 104 and 106 may be connected to network 124 via a wired or wireless interface. Note that while only two clients are shown in FIG. 1, in practice, embodiments may include many more clients, corresponding to devices belonging to users of the system. Clients 104 and 106 may include a mobile computing device such as a smartphone or tablet, a laptop computer, a desktop computer, or other suitable computing device. The client-server architecture allows a user to remotely access features of the environmental modeling server 102. Furthermore, embodiments can include a setting to allow for a community to follow public project pages to keep apprised of the status of a project.

Embodiments of the present invention may utilize a JavaScript Object Notation (JSON) web service to make a JSON call to the environmental modeling server 102. In some examples, the JSON call is made using XML HTTP, which implements an XML HTTP object that has functionality enabling the exchange of Extensible Markup Language (XML) data directly over the Internet using the Hypertext Transfer Protocol (HTTP). The XML HTTP object allows access of the environmental modeling server data, parsing the data using an XML Document Object Model (DOM), and posting XML data through a standard firewall directly to an HTTP server. Other protocols now known or hereafter developed may be utilized in future embodiments of the present invention.

The environmental modeling server 102 may be connected to a plurality of networked databases. One such database may include legal database 154. Legal database 154 may include a corpus of text describing laws, rules, and/or regulations for various jurisdictions, tax information, information regarding previous court case battles based on topic, and any other law related information. The jurisdictions can include international, federal, state, county, and/or local jurisdictions.

Another database may include organic database 156. The organic database may include a record for various plants that may be used in plans synthesized by the environmental modeling server 102. Each plant record may include various attributes used to classify the plant and/or its applications. These attributes may include, but are not limited to, a kingdom, division, class, series, family, genus, and/or species. Additional attributes may include, but are not limited to, soil type, light requirements, pH, medical use, food status, and/or tool applications. A variety of taxonomy systems may be utilized, such as the Angiosperm Phylogeny Group (APG) system for plant classification.

In addition to taxonomy, a variety of other attributes may be included in the organic database 156. One attribute can include a layer. In embodiments, there may be multiple layers. The layers can include a canopy layer, which includes the tallest trees. The layers can further include an understory layer, which includes trees that exist in areas where light can reach through the canopy layer. The layers can further include a shrub layer, which may include woody perennials. The layers can further include an herb layer. The layers can further include a soil surface/ground cover layer.

The layers can further include a rhizosphere (root layer). The layers can further include a vine layer. Other layers are possible in embodiments of the present invention.

Some attributes may be Boolean attributes used to facilitate fast searching and identification of potential plant species to match given criteria. One such attribute may include herb status. In embodiments, a plant with an herb status may include a vascular plant without significant woody tissue above or at the ground. These plants may be annual, biennial, or perennial. These plants can include, but are not limited to, ferns, horsetails, lycopods, and whisk-ferns.

Another such attribute may include a graminoid status. This status can apply to grass or grass-like plants, including grasses, sedges, rushes, arrow-grasses, and quillworts.

Another such attribute may include a shrub status. This status can apply to perennial, multi-stemmed woody plants that are usually less than 4 to 5 meters (13 to 16 feet) in height. Shrubs typically have several stems arising from, or near the ground, but may be taller than 5 meters or single-stemmed under certain environmental conditions.

Another such attribute may include a subshrub status. This status can apply to low-growing plants usually under 0.5 meters (1.5 feet) tall, that typically do not exceed 1 meter (3 feet) tall at maturity.

Another such attribute may include a tree status. This status can apply to perennial, woody plants with a single stem (trunk), normally greater than 4 to 5 meters (13 to 16 feet) in height. Under certain environmental conditions, some tree species in this classification may develop a multi-stemmed or short growth form (less than 4 meters or 13 feet in height).

Another such attribute may include a vine status. This status can apply to a climbing plant with relatively long stems, which can be woody or herbaceous. In some embodiments, other attributes may be included instead of, or in addition to, the aforementioned attributes.

Another database may include Geographic Information Systems (GIS) database 158. The GIS database 158 may include, but is not limited to, a record for geographical coordinates, zoning categories (commercial, industrial, residential, farmland, forest, etc.), climate information, soil information, landscape/terrain information, and/or other pertinent information.

The environmental modeling server 102 can obtain a variety of design criteria via clients 104 and 106. The environmental modeling server 102 may then query the legal database 154, organic database 156, and/or GIS database 158 to obtain pertinent information to devise a plan for a project. The project can include, but is not limited to, a landscape architecture project. The environmental modeling server 102 may then query services database 160, which contains listings of various firms and people for performing services required to implement a landscaping or landscape architecture project. The categories within the services database can include, but are not limited to, excavation, concrete, masonry, mechanical, engineering, user interface (UI) designers, user experience (UX) designers, electrical, telecommunications, plumbing, fire suppression, surveying, fencing, irrigation, carpentry, nursery, and/or other services.

For each firm and/or individual in the services database 160, a record with fields such as specialization, location, cost, size, and other fields is stored. This allows the environmental modeling server 102 to generate a proposed design team based on project requirements and a provided budget range. In some embodiments, the environmental modeling server 102 also generates a proposed construction team. In some embodiments, the environmental modeling server 102 also generates a proposed management team. In some embodiments, the environmental modeling server 102 also generates an agricultural recommendation. The agricultural recommendation can be based on a variety of factors. In some embodiments, generating an agricultural recommendation is based on a privacy requirement. For example, for an end customer desiring privacy, the environmental modeling server 102 may suggest plants that grow taller and fuller, (e.g. various varieties of hedge such as Arborvitae), to provide the desired privacy. In some embodiments, generating an agricultural recommendation is based on companion planting to help support the growth and life cycle of the privacy hedge. In some embodiments, generating an agricultural recommendation is based on a maintenance requirement. For example, for an end customer desiring minimal maintenance, the environmental modeling server 102 may suggest plants that require little maintenance, (e.g. various varieties of hedge such as Berberis), to meet the needs of the end customer. For the purposes of this disclosure, an end customer is the customer owning the property where the project is being deployed/built. Alternatively, in the case of a product the end customer is the consumer who will buy/use/interact with the product.

In some embodiments, generating an agricultural recommendation is based on its structural components—(i.e. to hold up a hillside from mud slides using natural solutions.) Alternatively, embodiments can work in conjunction with inorganic and/or organic components to form the structure of a building and/or product (i.e. living bamboo plants—clumps and runners—woven into a building's structure to act as the "columns" within the natural structure).

In some embodiments, generating an agricultural recommendation is based on an animal attraction requirement. For example, for an end customer desiring to attract hummingbirds, the environmental modeling server 102 may suggest plants that are known to attract hummingbirds, (e.g. plants such as Butterfly Weed, Geranium, and/or Morning Glory), to meet the criteria sought by the end customer. Thus, disclosed embodiments can provide results in a scenario in which an end customer desires an aromatherapy garden that is safe for children, pets, and attracts hummingbirds. Filters and/or other selection controls in a computer-implemented user interface allow an individual or designer to select the filters for various items including, but not limited to, specific plants that follow under these parameters and/or predetermined rules. Various plants are displayed to the user where the user scrolls through options, and is also able to determine companion plants, nutrients, inorganic materials, etc. that would be beneficial to overall growth. Furthermore, disclosed embodiments provide the user with an option to be guided through the program to help build up the various layers of permaculture, a cradle to cradle design model, net zero energy building, and/or a design based off of biomimicry. Thus, disclosed embodiments provide a designer and/or end customer the access and knowledge to achieve one's dream.

In some embodiments, generating material recommendations are based on its medical grade attributes—(i.e. plastic sheets used for surgery that have the pattern of shark skin to prevent buildup of bacteria and/or fungi; therefore, making the material as sterile as possible).

In some embodiments, generating an agricultural recommendation is based on a climate. For example, for an end customer living in a particularly harsh climate (e.g. colder in a higher altitude), the environmental modeling server 102 may suggest plants that are known to thrive in that environment (e.g. plants such as Rocky Mountain Columbine, Compact Pineleaf Penstemon, and/or Blaze Little Bluestem Grass).

In some embodiments, generating an agricultural recommendation is based on a geographical region. This can include, but is not limited to, a warm region, cold region, wet region, dry region, and/or other attributes. In some embodiments, the region may be inferred based on entered parameters such as a street address and/or ZIP code.

In some embodiments, generating an agricultural recommendation is based on a jurisdiction. In some embodiments, jurisdiction(s) may be inferred based on entered parameters such as a street address and/or ZIP code. Based on the jurisdiction(s), the environmental modeling server 102 may query the legal database 154 to obtain relevant laws and regulations pertaining to the landscape project or landscape architecture project. This may include permitting and licensing requirements for the project. In embodiments, the project may include, but is not limited to, a landscape project or landscape architecture project. In embodiments, the project may pertain to food, medicine, transportation, and/or other areas.

In embodiments, one or more users may specify various criteria via client devices 104 and/or 106. The environmental modeling server 102 then uses the input criteria, and queries appropriate information from the legal database 154, organic database 156, GIS database 158, and/or services database 160. Based on the retrieved information from the database, the environmental modeling server 102 generates a plan that may include formation of multiple teams, as well as one or more recommendations for firms/individuals to fill the team roles. The environmental modeling server 102 may also generate recommendations for items such as plants, lights, drainage equipment, fencing, and/or other items needed to implement a landscape architecture project. In some embodiments, the environmental modeling server 102 may further perform a rendering and/or simulation of what the landscape architecture project may look like once implemented. The aforementioned features can aid a landscape architect or designer in scoping out the work, and achieving the desired result of the end customer for whom the landscape architecture project is being implemented.

Another database may include inorganic database 162. Inorganic database 162 can include, but is not limited to, descriptions, costs, images, and/or specifications of various products that may potentially be used in a project, or in conjunction with that project. These products include, but are not limited to, lighting, ornamental decorations, fountains, bricks, rocks, drywall, glass, pavers, lumber, plumbing supplies, and/or irrigation equipment, to name a few. In embodiments, a bill of materials may be generated based on one or more products within organic database 156 and inorganic database 162. One or more of the aforementioned databases may be relational databases, accessible using Structured Query Language (SQL), blockchain distributed ledger, or other suitable technique.

Another database may include medical database 721. Medical database 721 can include various medical information, such as medical procedures or systems, types of laboratory made medications, compound structures, legal, uses, and/or other pertinent information, such as medicinal applications for various plants within organic database 156. Another database may include social database 723. Social database 723 may be based on information in one or more social media systems such as Facebook®, Instagram®, and/or others. Another database may include transportation database 725. Transportation database 725 may include information regarding roads, shipping routes, air traffic patterns, and/or other pertinent transportation information. In addition to the databases shown in FIG. 1, other databases may also be included.

Figure 2:
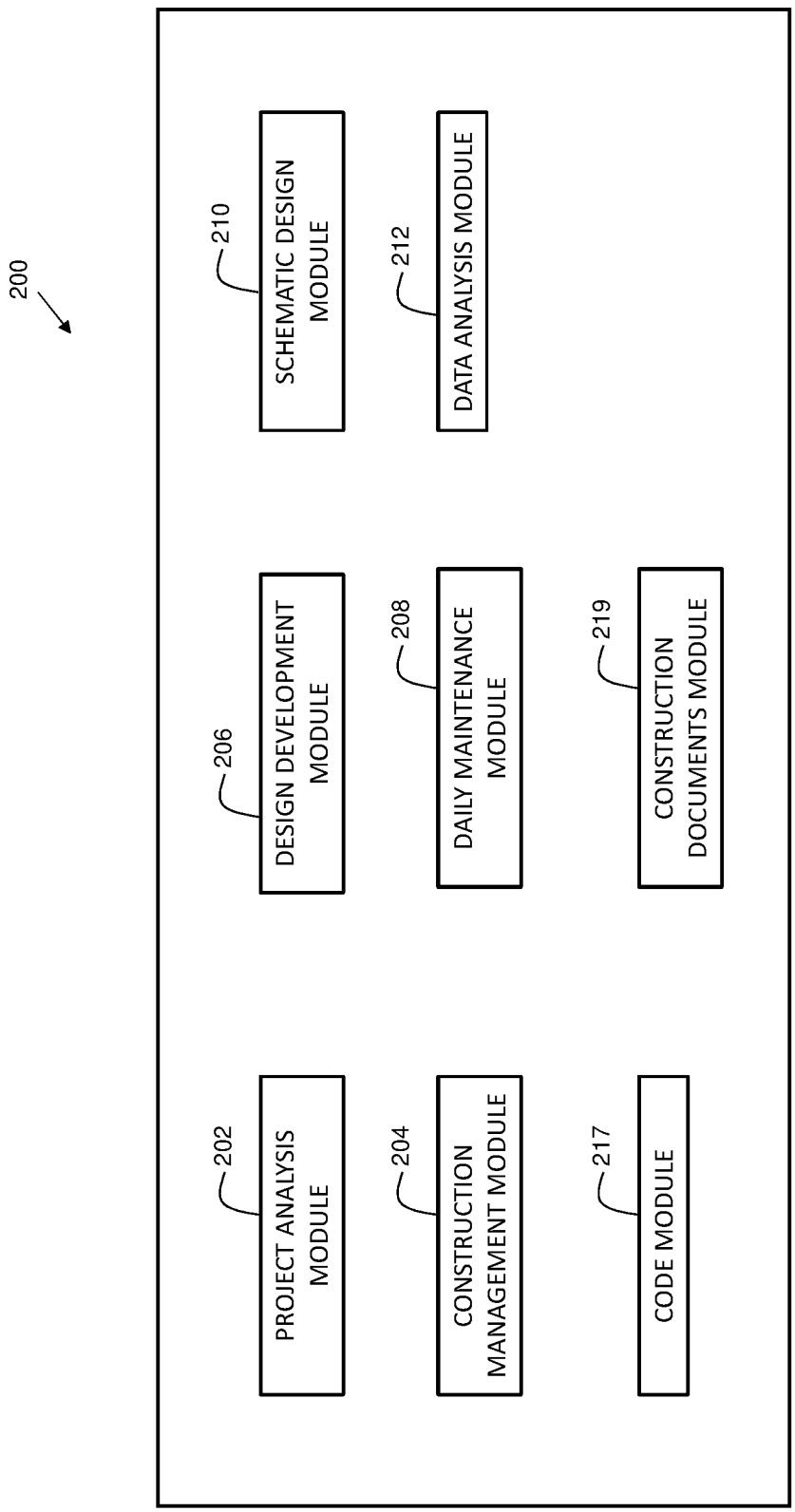
FIG. 2 is a diagram of modules in accordance with embodiments of the present invention.

FIG. 2 is a diagram 200 of modules in accordance with embodiments of the present invention. In embodiments, the modules may be implemented via software executing on environmental modeling server 102, dedicated hardware, or a combination of both. In some embodiments, the modules may be implemented in a cloud computing environment. The modules can include a project analysis module 202. The project analysis module 202 can receive as an input, GIS information from a variety of sources, including, but not limited to, GIS database 158 (FIG. 1), Google Earth, Ecotect®, and/or other suitable sources. The project analysis module 202 can further receive as input, end customer (user) information from sources such as vendors, proprietary databases, as well as social media systems such as Pinterest, and online marketplaces such as Houzz. The project analysis module 202 can further receive as input, legal information from legal database 154 and/or other sources, and may include, but is not limited to, laws, codes, regulations, and/or Homeowner Association (HOA) guidelines. The project analysis module 202 can further receive as input, information on firms/individuals for providing services or comprising members of one or more teams. The information can be input from services database 160, and/or other electronic sources including, but not limited to, Yelp®, and/or Angie's List. The firms/individuals retrieved from these sources can be used to staff teams including, but not limited to, design teams, construction teams, structural teams, and/or management teams. The project analysis module 202 can further receive as input, budget information, project criteria, and/or other important information from the client devices (e.g. 104 and 106 of FIG. 1) as entered by users of the environmental modeling server.

The modules can include a construction management module 204. The construction management module 204 can receive as an input, and track the status of, tasks, alerts, files (such as reports, change orders, RFIs, specifications, submittals, and/or photographs), people, construction documents, construction settings, deliveries, orders, timelines, and/or approvals and rejections. The construction management module may receive as input, and process, architectural data artifacts including, but not limited to, a site survey, site plan, floor plan, roof plan, door schedule, window and skylight schedule, ceiling plan, finished floor plan, mechanical, electrical, and plumbing (MEP) plans, interior elevations, exterior details, and/or interior details. In embodiments, the artifacts may be digital files in text form, binary form, markup language format, or other suitable data format.

The modules can include a schematic design module 210. The schematic design module 210 can receive as an input, information from precedents tools, boundaries tools, diagramming tools, schematic design concepts, mood boards, a working organic and/or inorganic material schedule, rough cost analysis tools, and client/user selections. The aforementioned items can include the use of smart objects and smart systems. The outputs can include data for use in presentation tools.

The modules can include a design development module 206. The design development module 206 can receive as an input, boundaries and guide tools, design massing studies, diagraming tools, simulations, design plans, including elevations, sections, perspectives, videos, development of organic and inorganic material and system schedules, development of cost analysis tools, daily management user interface, and/or client/user schematic design selection and requested modifications. The aforementioned items can include the use of smart objects and smart systems. Smart objects can be categorized into two aspects. One is the smart object that can interact with users and other objects. The smart object captures rich information to represent their functions in real situations. The information contains can be a composition of geometric definition and a database definition based on alphanumeric information transfer or specific formulas for describing the object properties. The other is the smart object that executes a procedure that contains rules, knowledge and data to perform a domain-specific task, and the programming code is necessary to handle various messages that it may receive. The smart object needs to combine the capabilities to represent various aspects of project information required to support multidisciplinary views of the object. It is encapsulating "intelligence" by representing behavioral aspects, design constraints, and life cycle data management features into the objects.) In some embodiments, the smart objects contain 3-dimensional information with various parameters, code, etc. and in some embodiments, may include image data from raster or vector images, such as Photoshop® or Illustrator® files. The outputs can include data for use in presentation tools.

The modules can include a daily maintenance module 208. The daily maintenance module 208 can receive as input, user or program alerts, photos, reports, profile information (e.g. from administrators, members, subscribers, and/or followers), approval statuses, and/or rejection statuses. The daily maintenance module 208 performs tasks that serve to keep a project organized and determine if the project needs to adapt or maintain given the current conditions based on the short term and long term goals. Furthermore, it serves to keep all the project stakeholders on the same page, during the day to day operation of the ever-evolving project. This module may create frequent updates to documents based on original document and revisions. Relevant project documents are linked to each other through the smart objects. Example functionality may include, but is not limited to, include tasks such as breaking down cost of restaurant design, construction, overhead, all the way down to meal costs and labor, or even the breakdown of transportation costs or energy consumed in order to achieve specific meal. Example functionality can further include creation and maintaining of a master document for development with abilities to determine individual vendor locations, as well as operational details such as determining what offerings are successful based on statistics of what is selling or what gets the most traffic.

The modules can include a data analysis module 212. The data analysis module 212 can receive as an input, alerts, observations, photos, reports, profile information (e.g. from administrators, members, subscribers, and/or followers), approval statuses, and/or rejection statuses. The aforementioned items can include smart objects and smart systems. The data analysis module 212 can perform a computerized analysis of the aforementioned objects.

In embodiments, the computerized analysis performed by the data analysis module 212 may include, but is not limited to, machine learning, deep learning, natural language processing (NLP), image processing, image recognition, and/or image classification.

Disclosed embodiments may utilize machine learning techniques, including, but not limited to, neural networks, supervised learning, unsupervised learning, and may utilize algorithms including, but not limited to, linear regression, logistic regression, decision trees, support vector machines, Naïve Bayes Classifiers, K-Means, Random Forest, and/or gradient boosting algorithms. Other techniques are possible in embodiments of the present invention.

The natural language processing utilized by the data analysis module 212, may include, but is not limited to, automatic text summarization, sentiment analysis, topic extraction, named entity recognition, parts-of-speech tagging, relationship extraction, stemming, text mining, machine translation, and/or automated question answering.

The image processing utilized by the data analysis module 212 may include, but is not limited to, applying filters to an image, performing edge detection, gradient analysis, and/or application of morphological operators. The image recognition and/or image classification utilized by the data analysis module 212 may include, but is not limited to, Deep Learning models, including Convolutional Neural Networks, and/or other suitable techniques.

The modules can include a construction document module 219. Construction document module 219 can receive as an input budget tools, details, guides, tools, layouts, schedules, and/or checklists. In some embodiments, the Construction Documents module 219 may create a computer-generated specifications document, and/or provide a template of a specification document, based on a project type. The computer-generated specifications document may include, but is not limited to, a variety of divisions (sections). Depending on the type of project, one or more of the sections might not be applicable, and may thus be designated as "N/A." The applicable sections may be completed or partially completed with information based on user inputs, and retrieved information from one or more of the databases shown in FIG. 1.

In embodiments, the specifications document includes, but is not limited to, the following divisions:
Division 00: Procurement and Contracting Requirements
Division 01: General Requirements
Division 02: Existing Conditions
Division 03: Concrete
Division 04: Masonry
Division 05: Metals
Division 06: Wood, Plastics, and Composites
Division 07: Thermal and Moisture Protection
Division 08: Openings—Doors, Windows and Glazing
Division 09: Finishes
Division 10: Specialties
Division 11: Equipment
Division 12: Furnishings
Division 13: Special Construction
Division 14: Conveying Equipment
Division 15: Mechanical
Division 16: Electrical
Division 17: Telecommunications
Division 18: Reserved
Division 19: Reserved
Division 20: Reserved
Division 21: Fire Suppression
Division 22: Plumbing
Division 23: Heating Ventilating and Air Conditioning
Division 24: Reserved
Division 25: Integrated Automation
Division 26: Electrical
Division 27: Communications
Division 28: Electronic Safety and Security
Division 29: Reserved
Division 30: Reserved
Division 31: Earthwork
Division 32: Exterior Improvements
Division 33: Utilities Division 34: Transportation
Division 35: Waterways and Marine Construction
Division 36: Reserved
Division 37: Reserved
Division 38: Reserved
Division 39: Reserved
Division 40: Process integration
Division 41: Material Processing and Handling Equipment
Division 42: Process Heating, Cooling, and Drying Equipment
Division 43: Process Gas and Liquid Handling, Purification and Storage Equipment
Division 44: Pollution Control Equipment
Division 45: Industry-Specific Manufacturing Equipment
Division 46: Water and Wastewater Equipment
Division 47: Reserved
Division 48: Electrical Power Generation
Division 49: Reserved Some embodiments may include more, or fewer, or different divisions.

The modules can include a code module 217. The code module 217 can enable open access to source code for a project, as well as provide an ability to accept updates from authorized parties.

Figure 3:
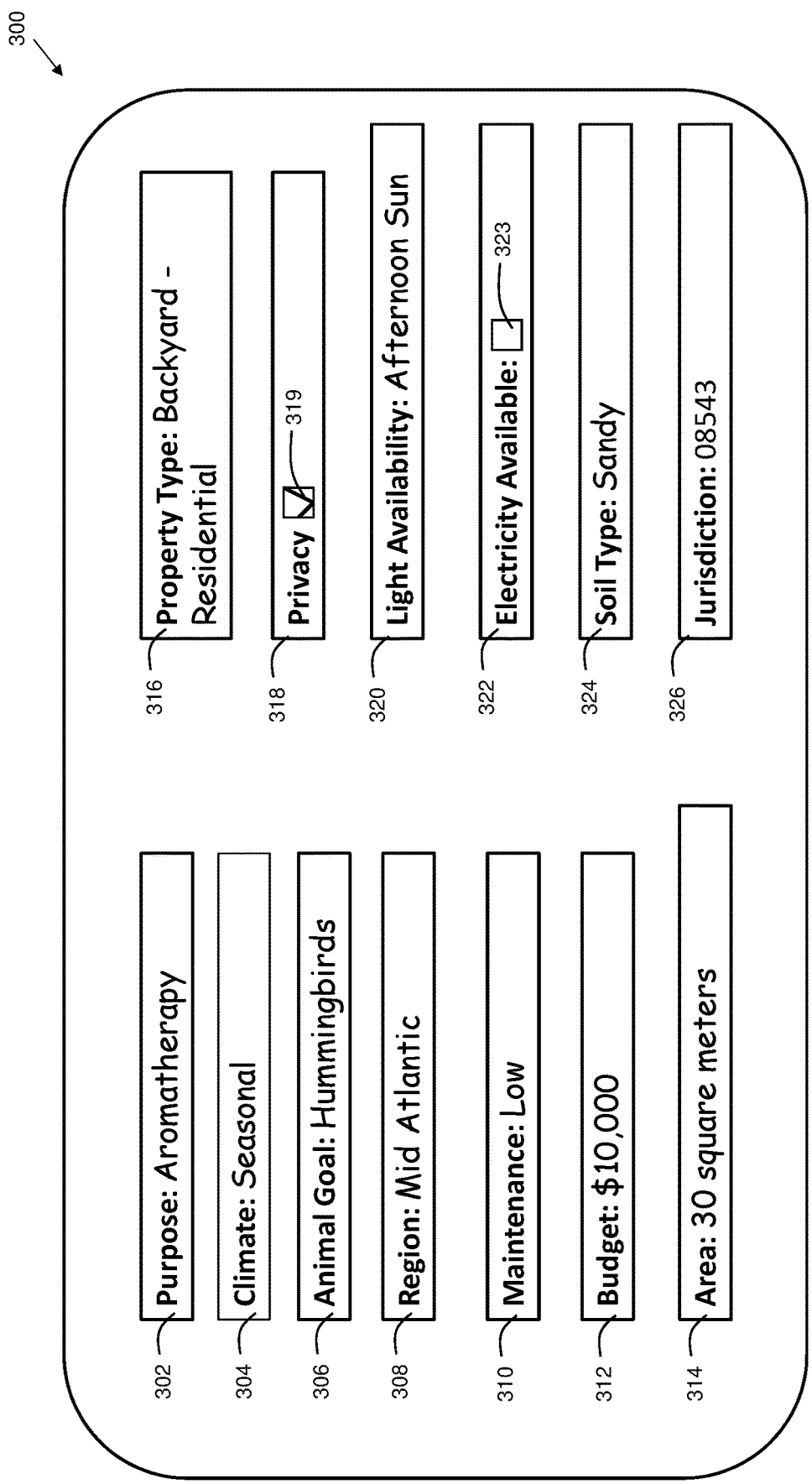
FIG. 3 is an exemplary user interface in accordance with embodiments of the present invention.

FIG. 3 is an exemplary user interface 300 in accordance with embodiments of the present invention. In embodiments, user interface 300 may be rendered on a client device such as 104 or 106 of FIG. 1. The client device may be a laptop computer, desktop computer, tablet computer, mobile phone, or other suitable electronic device. In embodiments, the user interface 300 may be implemented as a dedicated application on a computing device. In other embodiments, the user interface 300 may be browser based, where pages such as HTML pages are rendered in a browser on the client device to provide the user interface. User interface 300 includes a variety of data entry fields. Data entry field 302 allows a user to input a purpose. As an example, a purpose of aromatherapy is entered in field 302. In embodiments, the aromatherapy purpose may cause one or more of the various modules shown in FIG. 2 to suggest plantings that have fragrant properties.

Data entry field 304 allows a user to input a climate. As an example, a climate of Seasonal is entered in field 304. In embodiments, the entered climate may cause one or more of the various modules shown in FIG. 2 to suggest plantings that are appropriate for the entered climate (e.g. tropical, seasonal, cold, etc.). Thus, embodiments can include generating an agricultural recommendation based on a climate.

Data entry field 306 allows a user to input an animal goal. In embodiments, multiple animal goals may be input. As an example, an animal goal of hummingbirds is entered in field 306. In embodiments, the entered animal goal may cause one or more of the various modules shown in FIG. 2 to suggest plantings that are known to attract the animal of the animal goal (e.g. hummingbirds, butterflies, etc.) In some embodiments, the animal goal may cause embodiments to suggest another landscaping feature such as a pond or fountain (e.g. for fish or a bird bath, etc.,) or building materials, principles, etc. Thus, embodiments can include generating an agricultural recommendation based on an animal attraction requirement.

Data entry field 308 allows a user to input a region. As an example, a region of Mid Atlantic is entered in field 308. In embodiments, the entered region may cause one or more of the various modules shown in FIG. 2 to suggest plantings that are known to thrive in the given region. Thus, embodiments can include generating an agricultural recommendation based on a geographical region.

Data entry field 310 allows a user to input a maintenance preference. As an example, a maintenance preference of "low" is entered in field 310. In embodiments, the entered maintenance may cause one or more of the various modules shown in FIG. 2 to suggest plantings that are known to accommodate the maintenance preference. For example, if low maintenance is specified, then slow-growth plants may be suggested, to reduce the need for trimming. Thus, embodiments can include generating an agricultural recommendation based on a maintenance requirement.

Data entry field 312 allows a user to input a budget. As an example, a budget of $10,000 is entered in field 312. In embodiments, the entered budget may cause one or more of the various modules shown in FIG. 2 to suggest plantings of a variety and quantity to accommodate the budget.

Data entry field 314 allows a user to input an area for the project. As an example, an area of 30 square meters is entered in field 314. In embodiments, the entered area may cause one or more of the various modules shown in FIG. 2 to suggest planting varieties and the quantity of plantings to accommodate the area. For example, in a large area, disclosed embodiments may suggest trees and shrubs, whereas in a small area, disclosed embodiments may suggest flowers and shrubs, with no trees.

Data entry field 316 allows a user to input a property type. As an example, a property type of "Backyard—Residential" is entered in field 316. In embodiments, the entered property type may cause one or more of the various modules shown in FIG. 2 to suggest plantings suitable for that property type.

Data entry field 318 allows a user to select a privacy option. In embodiments, the user may enable the privacy option by selecting checkbox 319 (shown as selected/checked in FIG. 3). In embodiments, the selection of the privacy option may cause one or more of the various modules shown in FIG. 2 to suggest plantings that are known to provide privacy. For example, if the privacy option is selected, then tall-growing and/or dense plants may be suggested, to provide the desired privacy. Thus, embodiments can include generating an agricultural recommendation based on a privacy requirement.

Data entry field 320 allows a user to input a light availability. As an example, a light availability of "Afternoon Sun" is entered in field 320. Other example choices may include, but are not limited to, direct, or diffused light. In embodiments, the entered property type may cause one or more of the various modules shown in FIG. 2 to suggest plantings suitable for the entered lighting availability. For example, if the light availability is entered as "shaded" then disclosed embodiments may suggest plantings that are well suited to shady environments, such as *Heuchera* (Coral bells), *Lamium maculatum* (Dead nettle), and/or *Tiarella cordifolia* (Foam flower). Other light availability choices may include, but are not limited to, indirect, and north-facing.

Data entry field 322 allows a user to select an electricity available setting. In embodiments, the user may enable the electricity available setting by selecting checkbox 323 (shown as unselected/unchecked in FIG. 3). In embodiments, the selection of the electricity available setting may cause one or more of the various modules shown in FIG. 2 to suggest landscaping elements that require electricity. For example, if the electricity available setting is selected, then landscaping elements such as electric lights, pumps (e.g., for fountains), and/or other elements may be suggested. Conversely, if the electricity available setting is not selected, then solar lights may be suggested in disclosed embodiments.

Data entry field 324 allows a user to input a soil type. As an example, a soil type of "Sandy" is entered in field 324. In embodiments, the entered property type may cause one or more of the various modules shown in FIG. 2 to suggest plantings suitable for that soil type. For example, if the soil type is entered as sandy, then embodiments may suggest plants such as Cleome hassleriana, Gazania, and/or Rugosa Rose. Conversely, if the soil type is entered as rocky, then embodiments may suggest plants such as Common Bearberry, Bellflower, and/or Candytuft. These species are merely exemplary, and other species may be suggested for these and other categories in embodiments of the present invention.

Data entry field 326 allows a user to input a jurisdiction. As an example, a jurisdiction of 08543 is entered in field 326. In embodiments, the jurisdiction may be entered in the form of a ZIP code, or other postal code, city name, state, or other suitable jurisdiction. In some embodiments, entering a ZIP code in field 326 may automatically populate other fields such as region field 308, and/or climate field 304. In yet other embodiments, the region field 308 and the climate field 304 may be eliminated, if specified by the jurisdiction. In embodiments, the entered jurisdiction may cause one or more of the various modules shown in FIG. 2 to suggest plantings suitable for that jurisdiction. In some embodiments, the entered jurisdiction may cause one or more of the various modules shown in FIG. 2 to retrieve appropriate rules, laws, and/or regulations from legal database 154 (FIG. 1). Furthermore, in some embodiments, the entered jurisdiction may cause one or more of the various modules shown in FIG. 2 to retrieve information from GIS database 158 (FIG. 1) that corresponds to that jurisdiction. In some embodiments, more than one jurisdiction may be processed based on the entered jurisdiction in field 326. For example, in response to an entered jurisdiction of 08543, embodiments may retrieve appropriate local rules, local laws, and/or local regulations from legal database 154 for the jurisdiction of Princeton, N.J., as well as appropriate county rules, county laws, and/or county regulations from legal database 154 for Mercer County, N.J., as well as appropriate state rules, state laws, and/or state regulations from legal database 154 for the state of New Jersey. Thus, embodiments can determine nested jurisdictions, and retrieve appropriate information from the legal database 154 from multiple jurisdictions based on a single jurisdiction code entered in field 326.

Embodiments can therefore include generating an agricultural recommendation based on a jurisdiction. The user interface 300 is merely an example, and other embodiments may include more, fewer, or different fields, and may utilize other user interface controls (e.g. lists, checkboxes, radio buttons, etc.), voice control (speech-to-text processing) or other suitable data entry mechanisms.

Figure 4:
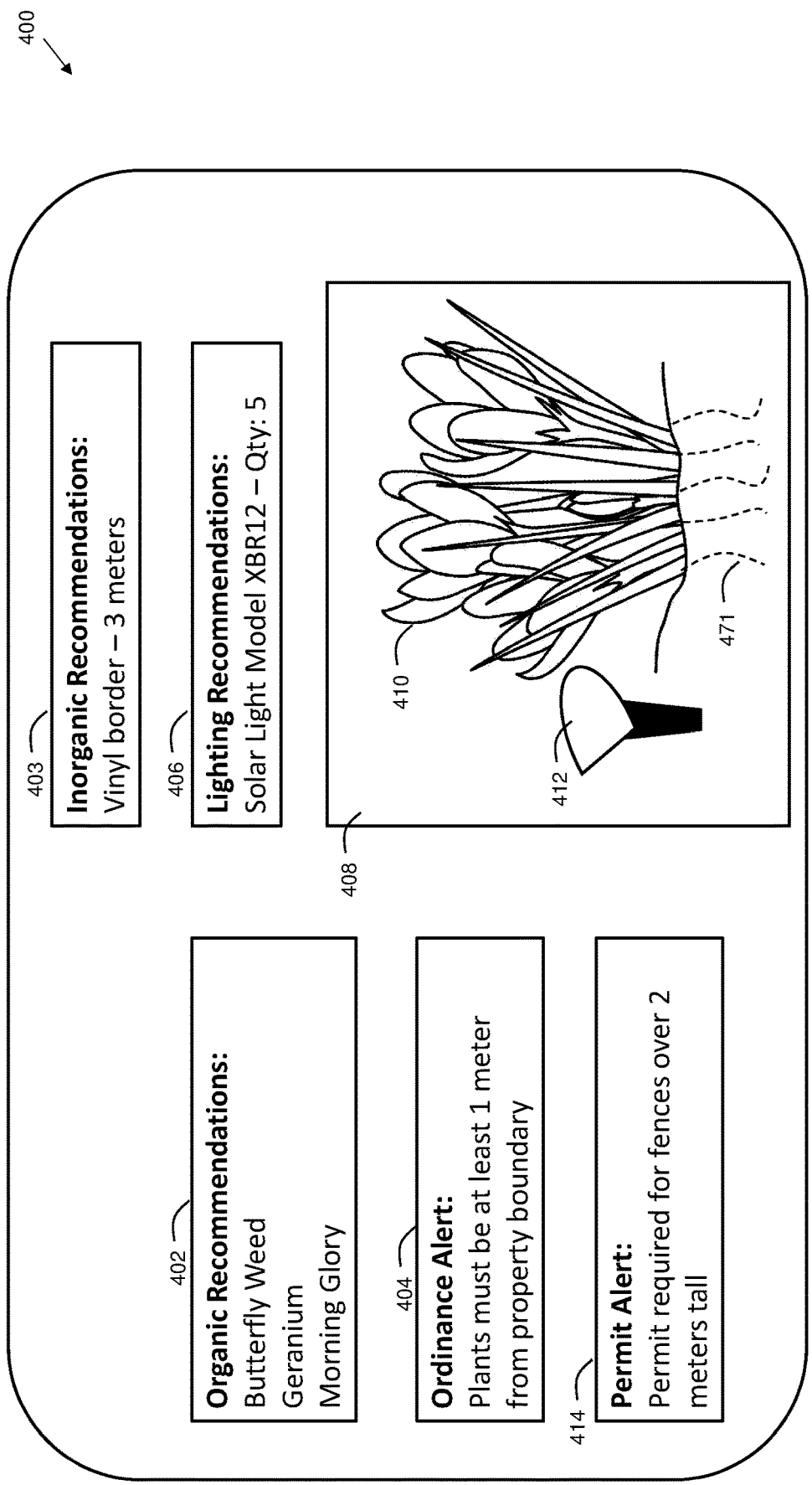
FIG. 4 is another exemplary user interface in accordance with embodiments of the present invention.

FIG. 4 is another exemplary user interface 400 in accordance with embodiments of the present invention. User interface 400 is an exemplary output of disclosed embodiments. In embodiments, user interface 400 may be rendered on a client device such as 104 or 106 of FIG. 1. The client device may be a laptop computer, desktop computer, tablet computer, mobile phone, or other suitable electronic device. In embodiments, the user interface 400 may be browser based, where pages such as HTML pages are rendered in a browser on the client device to provide the user interface. User interface 400 includes a variety of data output fields. Output field 402 includes a list of organic recommendations. In the example shown, the plant recommendations include the plants Butterfly Weed, Geranium, and Morning Glory. Thus, embodiments can include generating an agricultural recommendation.

Output field 403 includes inorganic recommendations. These recommendations can include, but are not limited to, borders, fencing, support structures, signage, and/or other design elements.

Output field 404 includes ordinance information. In embodiments, the ordinance information may be based on a jurisdiction entered in field 326 of FIG. 3, and corresponding information retrieved from legal database 154 (FIG. 1).

Output field 414 includes permit information. In embodiments, the permit information may be based on a jurisdiction entered in field 326 of FIG. 3, and corresponding information retrieved from legal database 154 (FIG. 1).

Output field 406 includes lighting recommendations. In embodiments, the lighting recommendations may be based on the selection of electricity available in field 322 of FIG. 3, and corresponding information retrieved from products database 162 (FIG. 1), or in some embodiments, from multiple product databases. In the example shown, the lighting recommendations include a solar light model, which, in embodiments, can be based on the input that electricity is not available.

Output field 408 includes a rendering(s), which can include a working design or example. The rendering can include an image of a product 412, such as a solar light indicated in output field 406. The product 412 can include an inorganic product and/or a system of products. The rendering can further include an image 410 of plants and/or other landscaping features. In embodiments, the image 410 may be a photograph. In other embodiments, the image 410 may be a computer-generated rendering. In some embodiments, the rendering may indicate the root system 471 for a plant. The root system can provide important information for planting decisions. In some embodiments, the rendering can be generated for a specific stage of growth (e.g. two months after planting, a year after planting, etc.). In some embodiments, the rendering can be generated for a specific season (e.g. to indicate the appearance of the landscape in spring, winter, autumn, and/or summer). In some embodiments, the rendering can be generated for a specific time of day (e.g. morning, afternoon, night). These options allow a landscape architect and/or end customer to observe a simulation of how the landscape may appear at a future time. This provides a benefit of simulating a variety of landscape possibilities prior to starting actual work on the project and/or acquisition of materials. Thus, embodiments can include generating a rendering of the recommendation. The recommendation may include, but is not limited to, an agricultural recommendation. In this way, greater client satisfaction can be achieved as engagement with the end customer is possible throughout the project lifecycle. The user interface 400 is merely an example, and other embodiments may provide additional information via additional user interface fields.

Figure 5:
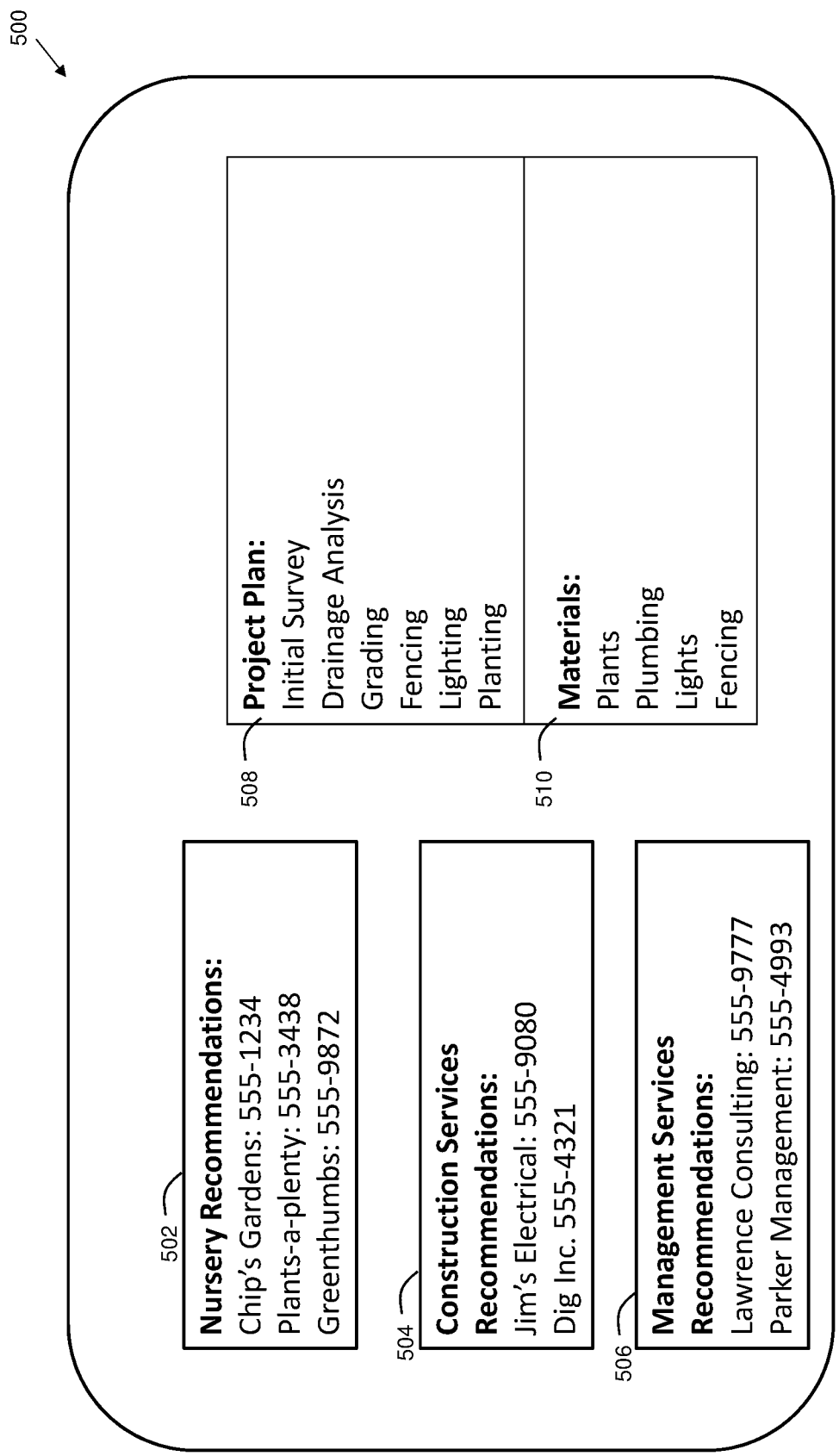
FIG. 5 is another exemplary user interface in accordance with embodiments of the present invention.

FIG. 5 is another exemplary user interface 500 in accordance with embodiments of the present invention. User interface 500 is another exemplary output of disclosed embodiments for team and project management. In embodiments, user interface 500 may be rendered on a client device such as 104 or 106 of FIG. 1. The client device may be a laptop computer, desktop computer, tablet computer, mobile phone, or other suitable electronic device. In embodiments, the user interface 500 may be browser based, where pages such as HTML pages are rendered in a browser on the client device to provide the user interface. User interface 500 includes a variety of data output fields. Output field 502 includes a list of nursery recommendations for acquiring plantings for the landscape project. The nursery recommendations may be retrieved from services database 160, and/or other electronic sources such as Yelp®, and/or Angie's List. Output field 504 includes a list of construction and/or fabricator service recommendations for performing work for the project. In embodiments, the project may be, but is not limited to, a landscape project. The construction service recommendations may be retrieved from services database 160, and/or other electronic sources such as Yelp®, and/or Angie's List. Thus, embodiments can include generating a proposed construction team. Output field 506 includes a list of management services recommendations for performing work for the landscape project. The management services may include, but are not limited to, general contractors overseeing the work of multiple subcontractors. The management services recommendations may be retrieved from services database 160, and/or other electronic sources such as Yelp®, and/or Angie's List, etc. Thus, embodiments can include generating a proposed management team. This can include, but is not limited to, a proposing team—i.e. if clients want to do the daily management of their project themselves.

Output field 508 includes a project plan. The project plan may include a plurality of steps. In some embodiments, the steps may be in a particular order. In some embodiments, one or more of the steps may be indicated as being performed in parallel (simultaneously). Output field 510 includes a bill of materials. The materials may include, but are not limited to, products obtained by the system from products (inorganic) database 162 (FIG. 1). The user interface 500 is merely an example, and other embodiments may provide additional information via additional user interface fields.

Figure 6:
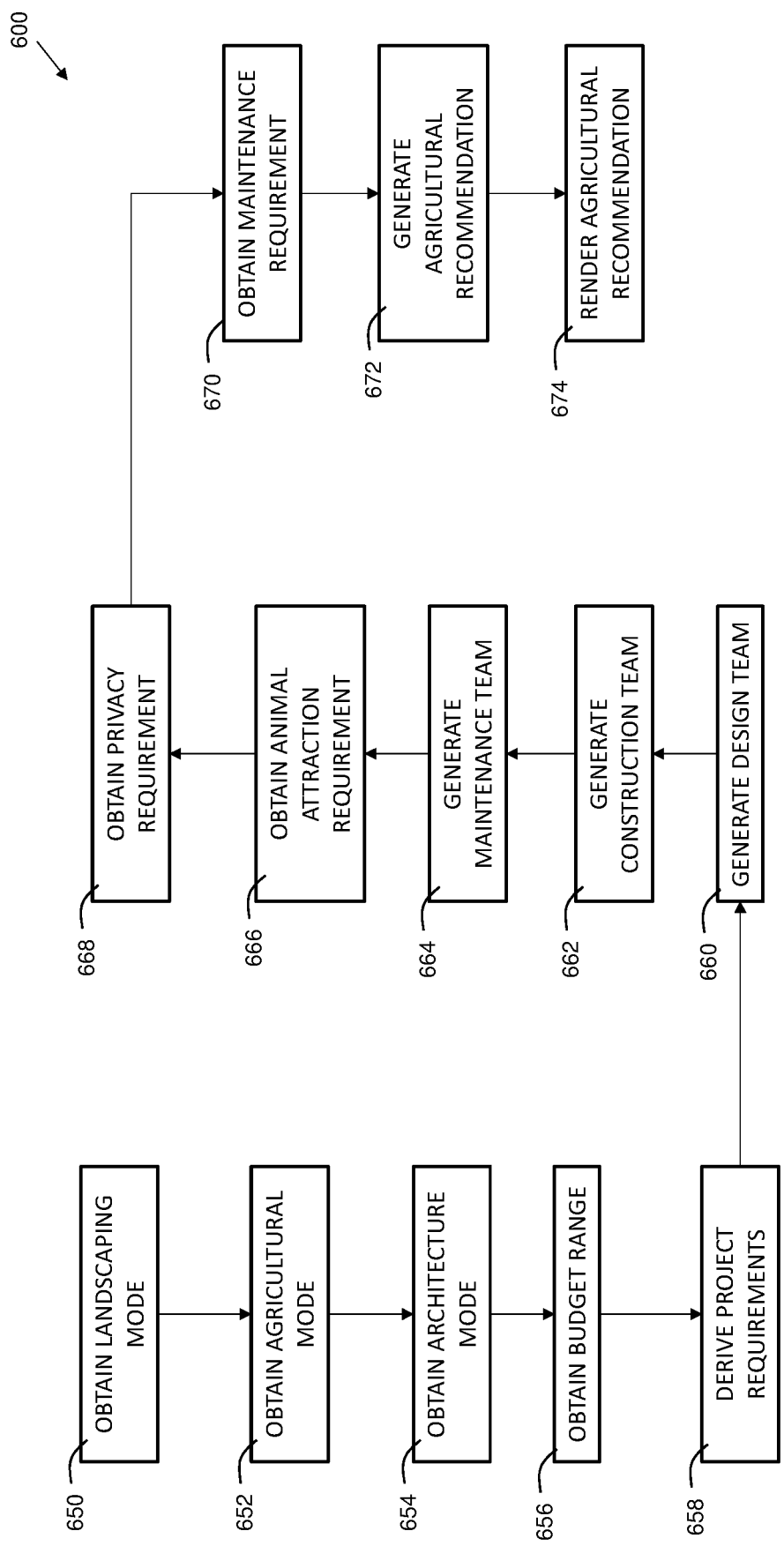
FIG. 6 is a flowchart indicating process steps for embodiments of the present invention.

FIG. 6 is a flowchart 600 indicating process steps for embodiments of the present invention. This is merely an example of one type of project that embodiments can be used with. Other project types are possible. At process step 650, a landscaping mode is obtained by the environmental modeling server. In embodiments, the landscaping mode can include, but is not limited to, potted plants, backyard, front yard, side yard, roof, vertical wall, and/or acreage. In embodiments, the landscaping mode may be used as a criterion to narrow the list of eligible plants and/or other landscaping elements. For example, if a landscaping mode of "roof" is entered, then a predefined rule may be used to eliminate plants that are not appropriate for use on a roof (e.g. large trees).

At process step 652, an agricultural mode is obtained by the environmental modeling server. In embodiments, the agricultural mode can include, but is not limited to, land, vertical farm, hydroponics, aeroponics, aquaponics, waterways, marine construction, and/or earthwork. In embodiments, the agricultural mode may be used as a criterion to narrow the list of eligible plants and/or other landscaping elements. For example, if an agricultural mode of "hydroponics" is entered by a user (e.g. via client 104 or 106), then a predefined rule may be used to select plants that are appropriate for use in a hydroponics environment. The predefined rule can, in response to detecting an agricultural mode of hydroponics, recommend plants such as vining plants, greens, fruits, and/or root crops. Recommended vining plants can include, but are not limited to, tomatoes, cucumbers, and/or peas. Recommended fruits can include, but are not limited to, raspberries and/or strawberries. Recommended greens can include, but are not limited to, lettuce, chard, spinach, and/or cabbage.

Aeroponics is an innovative way to grow plants by using an air mist environment without the use of soil. In embodiments, if an agricultural mode of "aeroponics" is selected, then the predefined rule can, in response to detecting an agricultural mode of "aeroponics," recommend items such as lettuce and herbs.

Aquaponics is a technique for growing plants by using a combination of hydroponics and aquaculture (fish and other water animals). Features of such a system include feeding water from an aquaculture system to a hydroponic system where the animal byproducts are broken down by bacteria into nitrites and subsequently into nitrates, which are utilized by the plants as nutrients. The water is then recirculated back to the aquaculture system. In embodiments, if an agricultural mode of "aquaponics" is selected, then the predefined rule can, in response to detecting an agricultural mode of "aquaponics," recommend items such as lettuce, arugula, basil, mint, chives, kale, and/or swiss chard. In addition to supporting plants, aquaponics may also be used for raising fish. In some embodiments, the predefined rule can, in response to detecting an agricultural mode of "aquaponics," recommend fish varieties such as tilapia, sunfish, crappie, and/or koi.

At process step 654, an architectural mode is obtained by the environmental modeling server. In embodiments, the architectural mode can include, but is not limited to, single family home, condominium, apartment, mobile home, office, factory, restaurant, hotel, church, casino, bank, research facility, and/or government building. In embodiments, the architectural mode may be used as a criterion to narrow the list of eligible plants and/or other landscaping elements. For example, if an architectural mode of "factory" is entered by a user (e.g. via client 104 or 106), then a predefined rule may be used to eliminate plants that are not appropriate for use in a factory landscape (e.g. high-maintenance decorative plants).

At process step 656 a budget range is obtained. This may be based on information entered in data entry field 312 (FIG. 3). In embodiments, the environmental modeling server may implement a rough cost analysis tool to estimate if the proposed bill of materials (e.g. as shown in 510 of FIG. 5) fits within constraints of the specified budget range. At process step 658, project requirements are derived. This can be based on information entered in data entry fields within FIG. 3. The project requirements can further be based on a variety of goals. The goals can include both individual goals and environmental goals. At process step 660, a design team is generated. This can include retrieving information from services database 160, and/or other electronic sources such as Yelp®, Houzz®, Etsy®, LinkedIn®, Facebook®, and/or Angie's List. The design team may utilize a variety of tools such as diagramming tools, basic 3D modeling using smart objects and/or smart systems and/or creating custom objects and linking items (templates & custom), 2D drawings (templates & custom), and presentation tools (templates, layouts, rendering tools, etc.). The design team can consider a variety of factors such as circulation, structure, wind, sun, light, oxygen, space, and/or shape, in order to create a finalized design.

At process step 662, a construction (or fabrication) team is generated. This can include retrieving information from services database 160, and/or other electronic sources such as Yelp®, and/or Angie's List, etc. At process step 664, a maintenance team is generated. This can include, but is not limited to, retrieving information from services database 160, and/or other electronic sources such as Yelp®, and/or Angie's List, etc.

Additional requirements may be obtained. At process step 666, an animal attraction requirement is obtained. This may be based on information entered in data entry field 306 of FIG. 3. At process step 668, a privacy requirement is obtained. This may be based on information entered in data entry field 318/319 of FIG. 3. At process step 670, a privacy requirement is obtained. This may be based on information entered in data entry field 310 of FIG. 3.

At process step 672 an agricultural recommendation is generated. This can include plant recommendations such as shown in field 402 of FIG. 4. At process step 674, a rendering of the agricultural recommendation may be output, such as shown in field 408 of FIG. 4. The rendering can include photos, illustrations, and/or computer-generated imagery (CGI) images.

In embodiments, one or more of the steps shown in flowchart 600 may be performed in a different order. In embodiments, one or more of the steps shown in flowchart 600 may be performed concurrently. In embodiments, one or more of the steps shown in flowchart 600 may be combined. In embodiments, one or more of the steps shown in flowchart 600 may be omitted. For example, in some embodiments, a single team may be generated for design, construction, and management of the project. In some embodiments, certain steps, such as obtaining an animal attraction requirement, may be omitted, and so on.

Disclosed embodiments may further take in to account, a variety of geographically specific considerations. These considerations can include geological disasters (e.g. avalanches, landslides, earthquakes, sinkholes, and/or volcanic eruptions). These considerations can further include meteorological disasters (e.g. blizzards, droughts, wildfires, hail storms, heatwaves, and/or tornados).

Disclosed embodiments, can further implement an iterative process, where feedback from one or more modules, and/or project teams is input back into the environmental modeling server. This allows documents to be revised since factors such as budgets, schedules, and teams may change over the course of a project.

As can now be appreciated, disclosed embodiments provide an improvement to technical fields including, but not limited to, landscape design and architecture products, medical equipment, prescription drugs, scientific studies, makeup, weapons, and/or training simulations. In embodiments, an environmental modeling server is in communication with multiple databases and/or knowledge systems, and performs computer-implemented methods in accordance with disclosed embodiments. In embodiments, one or more clients establish communications with the environmental modeling server for user interface purposes. In embodiments, the environmental modeling server may utilize predetermined rules for suggesting landscaping elements such as plants, lighting, fencing, irrigation, building materials, molecular compounds, animals, food, and more, based on input criteria. The environmental modeling server may acquire legal information pertaining to the project, based on jurisdictions that contain the location of the project. The environmental modeling server may further generate one or more teams to implement the project, such as design teams, structural teams, computer engineering teams, construction teams, and/or management/maintenance teams. The environmental modeling server may further produce a rendering and/or simulation of a landscaping or landscape architecture project to facilitate improved customer engagement, which may result in increased customer satisfaction as well as improved project performance in terms of scheduling, budget, and longevity of the project. Furthermore, in embodiments, a system in accordance with disclosed embodiments may be implemented using a Software as a Service (SaaS) model, and may be hosted via cloud servers.

When introducing elements of the present disclosure or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Storage media and computer readable media for containing code, or portions of code, can include any appropriate media known or used in the art, including storage media and communication media, such as but not limited to volatile and non-volatile (non-transitory), removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by a computer.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope.

What is claimed is:

1. A computer-implemented method for design, the computer-implemented method comprising:
receiving, from at least one client device associated with at least one user, design criteria and budget information associated with the design criteria;
receiving, from the at least one client device associated with the at least one user, vendor information associated with one or more proprietary databases or social media systems;
utilizing, via an environmental modeling server, the design criteria to query databases, wherein a subset of the databases comprise an organic database, a medical database, a legal database, and a geographic information systems (GIS) database,
wherein the databases are accessible using a blockchain distributed ledger,
wherein the organic database comprises records associated with plants,
wherein the medical database comprises medicinal applications for the plants,
wherein the legal database comprises laws, rules, and regulations for state, county, local, federal, and international jurisdictions, and
wherein the GIS database comprises a record of geographical coordinates, zoning categories, climate information, soil information, and landscape/terrain information;
obtaining, via the environmental modeling server, a landscaping mode;
obtaining, via the environmental modeling server, an agricultural mode;
obtaining, via the environmental modeling server, an architecture mode;
deriving, via the environmental modeling server, one or more project requirements from the obtained landscaping mode, the obtained agricultural mode, and the obtained architecture mode;
utilizing a design development module implemented via software executing on the environmental modeling server to perform a computerized analysis of received data to produce an output to be used in presentation tools,
wherein the received data comprises at least a smart object,
wherein the smart object is configured to interact with other objects and capture information to represent a function in a situation or execute a procedure that contains rules, knowledge, and data to perform a domain-specific task,
wherein the information comprises a geographic definition and a database definition based on alphanumeric information transfer or specific formulas for describing properties of the smart object, and
wherein the smart object contains three-dimensional information with image data from raster or vector images; and
generating, via the environmental modeling server, a proposed design team and a proposed construction team based on the one or more project requirements, the budget information, and the vendor information.

2. The computer-implemented method of claim 1, further comprising generating, via the environmental modeling server, a proposed management team.

3. The computer-implemented method of claim 1, further comprising generating, via the environmental modeling server, an agricultural recommendation.

4. The computer-implemented method of claim 3, wherein generating the agricultural recommendation is based on a privacy requirement.

5. The computer-implemented method of claim 3, wherein generating the agricultural recommendation is based on an animal attraction requirement.

6. The computer-implemented method of claim 3, wherein generating the agricultural recommendation is based on a maintenance requirement.

7. The computer-implemented method of claim 3, wherein generating the agricultural recommendation is based on a climate.

8. The computer-implemented method of claim 3, wherein generating the agricultural recommendation is based on a geographical region.

9. The computer-implemented method of claim 3, wherein generating the agricultural recommendation is based on a jurisdiction.

10. The computer-implemented method of claim 3, further comprising generating, via the environmental modeling server, a rendering of the agricultural recommendation.

11. An electronic computing device comprising:
a processor;
a memory coupled to the processor, the memory containing instructions, that when executed by the processor, perform the steps of:
receiving, from at least one user, design criteria and budget information associated with the design criteria;
receiving, from the at least one user, vendor information associated with one or more proprietary databases or social media systems;
utilizing design criteria to query databases,
wherein a subset of the databases comprise an organic database, a medical database, a legal database, and a geographic information systems (GIS) database,
wherein the databases are accessible using a blockchain distributed ledger,
wherein the organic database comprises records associated with plants,
wherein the medical database comprises medicinal applications for the plants,
wherein the legal database comprises laws, rules, and regulations for state, county, local, federal, and international jurisdictions, and
wherein the GIS database comprises a record of geographical coordinates, zoning categories, climate information, soil information, and landscape/terrain information;
obtaining a landscaping mode;
obtaining an agricultural mode;
obtaining an architecture mode;
deriving one or more project requirements from the obtained landscaping mode, the obtained agricultural mode, and the obtained architecture mode;
performing a computerized analysis of received data to produce an output to be used in presentation tools,
wherein the received data comprises at least a smart object,
wherein the smart object is configured to interact with other objects and capture information to represent a function in a situation or execute a procedure that contains rules, knowledge, and data to perform a domain-specific task;
wherein the information comprises a geographic definition and a database definition based on alphanumeric information transfer or specific formulas for describing properties of the smart object, and
wherein the smart object contains three-dimensional information with image data from raster or vector images; and
generating a proposed design team and a proposed construction team based on the one or more project requirements, the budget information, and the vendor information.

12. The electronic computing device of claim 11, wherein the memory further comprises instructions, that when executed by the processor, perform the step of, generating a proposed management team.

13. The electronic computing device of claim 11, wherein the memory further comprises instructions, that when executed by the processor, perform the step of, generating an agricultural recommendation.

14. The electronic computing device of claim 13, wherein the memory further comprises instructions, that when executed by the processor, perform the step of, generating a rendering of the agricultural recommendation.

15. A computer program product for design, for an electronic computing device comprising a non-transitory computer readable storage medium having program instructions embodied therewith, the program instructions executable by a processor to cause the electronic computing device to:
- receive, from at least one user, design criteria and budget information associated with the design criteria;
- receive, from the least one user, vendor information associated with one or more proprietary databases or social media systems;
- utilize design criteria to query databases,
  - wherein a subset of the databases comprise an organic database, a medical database, a legal database, and a geographic information systems (GIS) database,
  - wherein the databases are accessible using a blockchain distributed ledger,
  - wherein the organic database comprises records associated with plants,
  - wherein the medical database comprises medicinal applications for the plants,
  - wherein the legal database comprises laws, rules, and regulations for state, county, local, federal, and international jurisdictions, and
  - wherein the GIS database comprises a record of geographical coordinates, zoning categories, climate information, soil information, and landscape/terrain information;
- obtain a landscaping mode;
- obtain an agricultural mode;
- obtain an architecture mode;
- derive one or more project requirements from the obtained landscaping mode, the obtained agricultural mode, and the obtained architecture mode;
- perform a computerized analysis of received data to produce an output to be used in presentation tools,
  - wherein the output comprises at least a smart object,
  - wherein the smart object is configured to interact with other objects and capture information to represent a function in a situation or execute a procedure that contains rules, knowledge, and data to perform a domain-specific task,
  - wherein the information comprises a geographic definition and a database definition based on alphanumeric information transfer or specific formulas for describing properties of the smart object, and
  - wherein the smart object contains three-dimensional information with image data from raster or vector images; and
- generate a proposed design team and a proposed construction team based on the project requirements, the budget information, and the vendor information.

16. The computer program product of claim 15, further comprising program instructions executable by a processor to cause the electronic computing device to generate an agricultural recommendation.

17. The computer program product of claim 16, further comprising program instructions executable by a processor to cause the electronic computing device to generate a rendering of the agricultural recommendation.

* * * * *